Patented Sept. 28, 1948

2,449,988

UNITED STATES PATENT OFFICE 2,449,988

PREPARATION OF POLYCARBOXYLIC ACIDS

Thomas L. Gresham, Akron, Ohio, assignor to The B. F. Goodrich Company, New York, N. Y., a corporation of New York No Drawing. Application October 5, 1945, Serial No. 620,656

6 Claims. (Cl. 260—537)

This invention relates to the preparation of polycarboxylic acids in which two carboxyl groups are beta-substituted with respect to each other, and is particularly concerned with the preparation of such compounds from beta-lactones.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner beta-propiolactone (also called hydracrylic acid lactone),

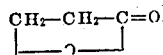

is economically obtained from ketene and formaldehyde.

I have now discovered that beta-propiolactone may readily be converted into succinic acid, and that other beta-lactones may similarly be used to produce other polycarboxylic acids.

This inversion is accomplished, according to this invention, by first reacting the lactone with an inorganic cyanide, preferably while the reactants are dissolved in a polar solvent such as water, and subjecting the reaction product preferably directly from the reaction mixture, to hydrolyzing conditions. The chemical changes involved may be represented in part by the following equation, it being probable that succinamic acid is an intermediate in the hydrolysis of the beta-cyano acid to the polycarboxylic acid (see Ives and Sames, Jour. Chem. Soc. 1943, Part III, pp. 513–517):

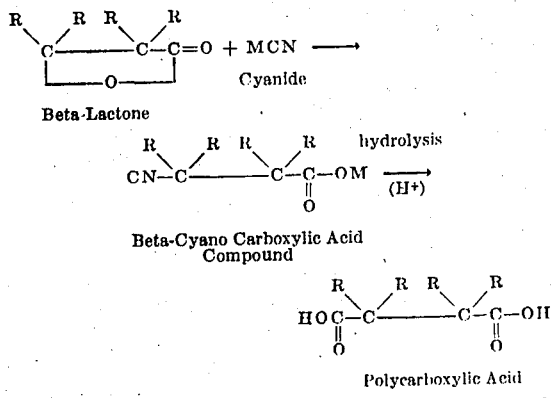

where R is hydrogen or a substituent radical and M is a positive inorganic radical such as hydrogen, ammonium or a metallic radical.

Although it is possible to react beta-lactones with salts of hydrocyanic acid and thereby to obtain salts of beta-cyano carboxylic acids (this reaction being a species of the generic invention of reaction of beta-lactones with inorganic salts as disclosed in my copending application Ser. No. 620,655, filed October 5, 1945), the salt so prepared is difficult to isolate as such or as the corresponding free acid, and hence when it is hydrolyzed in a separate step to a polycarboxylic acid, the overall yield is ordinarily quite low. Much higher yields of polycarboxylic acid are obtained with much greater ease if the product of reaction of lactone with cyanide (presumably a beta-cyano carboxylic acid or a salt thereof) is hydrolyzed directly from the reaction mixture without being isolated, and hence the present invention is preferably practiced in this manner.

As a specific example of this method of practicing the invention succinic acid is prepared from beta-propiolactone as follows:

An aqueous solution of sodium cyanide is prepared by dissolving 54 grams (10% more than 1 mole) of sodium cyanide in sufficient water to produce 175 ml. of solution, and this solution is cooled to a temperature of about —10° C. 72 grams (63 ml. —1 mole) of beta-propiolactone are then added to the solution in small portions with stirring of the solution and sufficient cooling to maintain the temperature at —10 to —5° C., the addition requiring about two hours. The reaction mixture is allowed to warm to room temperature; is mixed with 410 ml. of concentrated hydrochloric acid (sp. gr. 1.16, 31.45% HCl) and the resulting solution refluxed for about 14 hrs., the temperature of reflux being about 130 to 140° C. The solution is then concentrated by distilling off a considerable portion of water and HCl, and is extracted with acetone. From the acetone extract succinic acid is isolated which, after recrystallization from water, is obtained in 60% yield.

Numerous variations in the method of procedure of this example may be effected and about the same yield of polycarboxylic acid obtained, there being nothing critical in the conditions for reaction of lactone with cyanide or for hydrolysis of the reaction product.

Thus, any desired quantities of lactone and cyanide may be used, but in general it is preferable that about equal molecular proportions of the reactants or an excess of cyanide, say from about 1 to 5 moles of cyanide to 1 mole of lactone, be employed because of the tendency for any excess beta-lactone to polymerize and/or to react with the beta-cyano carboxylic acid salt formed to produce a beta-polyacyloxy carboxylic acid having a cyano group beta substituted in any acyloxy radical (the reaction of beta-lactones with carboxylic acid salts in accordance with the equation:

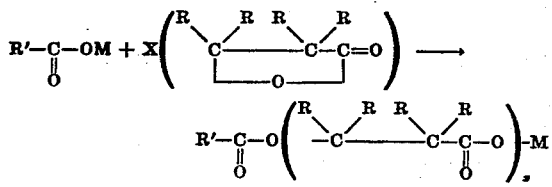

where R' is an organic radical, including those with a substituent cyano group, and $x$ is the number of lactone molecules, is disclosed in the copending application of Thomas L. Gresham and Jacob Eden Jansen Ser. No. 620,658 filed October 5, 1945), which acid breaks down at the ester linkage on hydrolysis to yield a beta hydroxy carboxylic acid in addition to the desired polycarboxylic acid, thereby complicating the reaction without increasing the yield of the product desired.

The temperature at which the reaction of cyanide with beta-lactone occurs is preferably kept below room temperature but this is not a critical condition since any temperature at which the reactants may conveniently be brought into contact with each other may be used. When the reaction is carried out in water solution, as is preferred, convenient temperatures vary from the freezing point to the boiling point of the solution or from about —20° C. or lower in some instances to 100° C. or even higher. To illustrate the fact that temperature is not critical, in another example of the invention carried out as described above except that the temperature at which the cyanide reacts with the beta-lactone is between 50 and 65° C. (instead of —10 to —5° C.), a 52% yield of succinic acid is obtained.

Hydrolysis of the reaction product may be accomplished by the use of any of the well-known conditions for conversion of a cyano group to a carboxyl group. It may be effected during the reaction to form the beta cyano acid if water is present, particularly when operating at temperatures above room temperature. It may be effected by boiling the reaction product with strong aqueous alkali or strong aqueous acid or simply by heating the solution if water is present without adding a hydrolyzing agent. If an alkali is used, the product is of course a solution of a salt of the desired polycarboxylic acid from which the free acid is liberated on acidification. Aqueous solutions or water-alcohol solutions of acids or alkalies may be employed in the hydrolysis, and the product in the latter case may be obtained as an ester of the polycarboxylic acid. As examples of these variations in hydrolyzing conditions, refluxing of the reaction product of sodium cyanide and beta-propiolactone obtained in the same manner as described above for 18 hours with sodium hydroxide solution (instead of with HCl) produces, on acidification, a 43% yield of succinic acid, and refluxing with a solution of sulfuric acid in ethanol for 2 hours produces a 41% yield of succinic acid in the form of the diethyl ester.

In addition to the above-described variations in the method of procedure of the specific example, variations may also be effected in the nature of the reactants used. Instead of sodium cyanide other inorganic cyanides including other alkali metal cyanides, alkaline earth cyanide such as calcium cyanide, and still other metallic cyanides, as well as hydrogen cyanides and ammonium cyanide, may also be employed. Cyanides which are water-soluble are, of course, preferably used since the reaction is preferably carried out in aqueous solution.

Although the preparation of succinic acid from beta-propiolactone is the preferred embodiment of the invention because of the low cost of beta-propiolactone, the homologs of beta-propiolactone, that is other saturated aliphatic beta-lactones, such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, beta-methyl-beta-valerolactone and the like, may also be used to produce other saturated aliphatic dicarboxylic acids in which the carboxyl groups are beta to each other. Similarly other lactones of beta-hydroxy monocarboxylic acids including those containing cycloalkyl, aryl and aralkyl substituents, such as beta-cyclohexyl-beta-propiolactone, beta-phenyl-beta-propiolactone, alpha-phenyl-beta-propiolactone, beta-benzyl-beta-propiolactone and the like may be used to yield other dicarboxylic acids. All of the above-mentioned beta-lactones are of the general structure

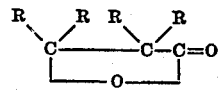

wherein R is hydrogen or an unreactive hydrocarbon group (i. e., a hydrocarbon group free from aliphatic unsaturation) and may be prepared in the manner described in the above-mentioned Küng patent. Still other beta-lactones are known and are also contemplated by this invention. Among these are beta-lactones of unsaturated beta-hydroxy carboxylic acids (which may be used to produce unsaturated polycarboxylic acids), mono-lactones of dicarboxylic acids (which may be used to produce tricarboxylic acids having two carboxyl groups beta to each other) and dilactones of dicarboxylic acids in which at least one of the lactones is beta. Examples of these lactones include alpha, alpha-dimethyl-beta-propiolactone-beta carboxylic acid; trimethyl-beta-propiolactone-beta-carboxylic acid; beta-beta-dimethyl-beta-propiolactone-alpha-carboxylic acid; and the beta-delta-dilactone of citrylidene malonic acid, all of which, like the beta-lactones before mentioned, are, except for carbonoxy structure

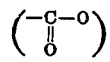

composed exclusively of hydrogen and carbon atoms. Still other beta-lactones contain, in addition to carbonoxy structure and hydrogen and carbon atoms, other elements such as oxygen, nitrogen, sulfur and halogen which may be present in essentially unreactive structure such as nitro groups and ether linkages or in radicals containing reactive hydrogen such as amino and hydroxy. Examples of such latter compounds are alpha or beta-nitrophenyl-beta-propiolactone; beta-(O-nitro-m-chlorophenyl)-beta-propiolactone; beta (O-nitro-m-methoxyphenyl)-beta-propiolactone; alpha-hydroxy-beta-phenyl-beta-propiolactone and alpha-bromo-beta-beta-dimethyl-beta-propiolactone-alpha-carboxylic acid.

In short the method of this invention may be utilized in preparing polycarboxylic acids from any of the generic class of beta-lactones. Beta-lactones which are water-soluble are preferably used since the reaction is preferably effected in aqueous solution.

It is also within the scope of the invention to carry out the reaction of a beta-lactone with an inorganic cyanide in other than aqueous solution. For example, the lactone and cyanide may be reacted in a solvent other than water in which they are both soluble to obtain a beta-cyano carboxylic acid and this product then hydrolyzed. Solvents which will dissolve many lactones and many cyanides are generally polar solvents such as alcohols, organic nitriles, nitro paraffins and the like. The reaction may also be effected without any solvent if reactive contact between the lactone and the cyanide may be secured, as by passing hydrogen cyanide into the lactone.

Numerous other variations and modifications in the procedure described herein will occur to those skilled in the art and are within the spirit and scope of the invention as defined in the appended claims.

I claim:
1. The method of preparing an aliphatic dicarboxylic acid in which the two carboxyl groups are in beta position with respect to one another which comprises bringing together, in solution in a polar solvent selected from the class consisting of water and alcohol, reactants consisting of a water-soluble saturated aliphatic beta-lactone and an inorganic cyanide having the formula MCN wherein M is selected from the class consisting of hydrogen, ammonium and alkali and alkaline earth metals, while maintaining the temperature of the solution between its freezing point and its boiling point to form in solution a beta-cyano carboxylic acid compound, subjecting the solution containing the said compound to hydrolyzing conditions to convert the cyano group to a carboxyl group and then recovering the resulting dicarboxylic acid from the final reaction mixture.

2. The method of preparing succinic acid which comprises bringing together in aqueous solution beta-propiolactone and an alkali metal cyanide while maintaining the temperature of the solution between its freezing point and its boiling point to form in solution an alkali salt of beta-cyano propionic acid, subjecting the solution containing the said salt to hydrolyzing conditions to convert the cyano group to a carboxyl group and then recovering succinic acid from the final reaction mixture.

3. The process for preparing an aliphatic dicarboxylic acid in which the two carboxyl groups are in beta position with respect to each other which comprises the steps of preparing a solution of an inorganic cyanide of the formula MCN wherein M is selected from the class consisting of hydrogen, ammonium and alkali and alkaline earth metals in a polar solvent selected from the class consisting of water and alcohol, adding to this solution a water-soluble saturated aliphatic beta-lactone while maintaining the temperature of the solution between −20 and +100° C., treating the resulting mixture with a hydrolyzing agent comprising water, refluxing the so-treated mixture and recovering a dicarboxylic acid therefrom.

4. The process for preparing succinic acid which comprises the steps of preparing an aqueous solution of an alkali metal cyanide, adding beta-propiolactone to the solution while maintaining its temperature between −10 and +65° C., treating the resulting mixture with aqueous alkali solution, refluxing the so-treated mixture to form a solution containing an alkali metal salt of succinic acid and recovering succinic acid from the said salt.

5. The process for preparing succinic acid which comprises the steps of preparing an aqueous solution of an alkali metal cyanide, adding beta-propiolactone to the solution while maintaining its temperature between −10 and +65° C., treating the resulting mixture with a strong aqueous acid solution, refluxing the so-treated mixture, and recovering succinic acid therefrom.

6. The process for preparing succinic acid which comprises the steps of preparing an aqueous solution of an alkali metal cyanide in a polar solvent selected from the class consisting of water and alcohol, adding beta-propiolactone to the solution while maintaining its temperature between −20 and +100° C., treating the resulting mixture with an aqueous hydrolyzing agent, refluxing the so-treated mixture and recovering succinic acid therefrom.

THOMAS L. GRESHAM.

REFERENCES CITED

The following references are of record in the file of this patent:

Fittig, et al., Liebig's Annalen, vol. 226, pages 326–347 (1884).
Wislicenus, Liebig's Annalen, vol. 233, pages 101–116 (1886).
Blaise, Compt. rendus (Fr. Acad. Sci.) vol. 124, pages 89–91 (1897).
Blaise, Bull. Soc. Chim. de France (3) vol. 29, pages 335–336 (1903).
Blanc, Bull. Soc. Chim. de France (3) vol. 33, pages 886–890 (1905).
Johansson, Berichte (Deutsch. Chem. Gesell) vol. 48, pages 1262–1266 (1915).
Johansson, Chem. Zentallblatt, vol. 1916, II, page 557.
MacArdle, Solvents in Synthetic Org. Chem. (1925) pages 1–3.
Walton, Jour. Chem. Soc. 1940, pages 438–442.
Spencer, et al., Jour. Am. Chem. Soc., vol. 63, pages 1281–1285 (1941).

Certificate of Correction

September 28, 1948.

Patent No. 2,449,988.

THOMAS L. GRESHAM

It is hereby certified that errors appear in the printed specification of the above numbered patent requiring correction as follows:

Column 1, line 22, for "inversion" read *conversion*; column 2, line 55, for the words "in any" read *in an*;
and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*